Dec. 20, 1966 J. N. NAY ET AL 3,293,599

MAP DISPLAY APPARATUS

Filed July 1, 1964 5 Sheets-Sheet 1

INVENTORS
JOE N. NAY
LEON G. WILDE
BY
Weingarten, Orenbuch & Lahive
ATTORNEYS

INVENTORS
JOE N. NAY
LEON G. WILDE

Dec. 20, 1966   J. N. NAY ET AL   3,293,599
MAP DISPLAY APPARATUS
Filed July 1, 1964   5 Sheets-Sheet 4

INVENTORS
JOE N. NAY
LEON G. WILDE
BY Weingarten, Ovenbuck & Lahive
ATTORNEY

INVENTORS
JOE N. NAY
LEON G. WILDE
BY
Weingarten, Orenbuch & Lahive
ATTORNEYS

United States Patent Office 3,293,599
Patented Dec. 20, 1966

3,293,599
MAP DISPLAY APPARATUS
Joe N. Nay, Allston, and Leon G. Wilde, Andover, Mass., assignors to Laboratory For Electronics, Inc., Boston, Mass., a corporation of Delaware
Filed July 1, 1964, Ser. No. 379,634
2 Claims. (Cl. 340—24)

This invention relates generally to map display apparatus and more particularly pertains to a device for assisting an aviator or navigator in determining the position of his craft by displaying its position upon a map.

In air travel, long distances can be covered in short periods of time so that maps large enough to show in detail the area over which an aircraft can range are cumbersome and inconvenient to use. Known systems for displaying the position of a craft upon a map, range from the simple to very elaborate types. An example of the simple type is the strip map which is selected so that the preplanned route runs along the center of the map strip. The strip is sufficiently wide to anticipate minor deviations, due to drift and navigational error, from the preplanned route. Generally, the strip is cut from a larger map or a number of maps and in the latter case the strips are pasted together to form one long sequence. The strip map, during the flight, is moved underneath a cursor as the craft progresses along its route. The cursor is able to move orthogonally to the map motion to indicate the deviation of the craft from the planned route and is limited in that motion by the width of the map strip. The map drive is regulated by along course velocity signals obtained from navigational apparatus, such as a radar set, carried aboard the craft. Across course velocity signals, obtained from the airborne navigational apparatus, are employed to regulate the cursor drive. The principal disadvantages of the strip map type display are that only preselected routes can be displayed and that where an alternate destination is chosen during flight, it is not possible to display the alternate route unless it happens to be on the selected chart strip. Special provisions must be made where the flight operates over territory not on the strip map. The advantage of the strip type map display resides in its mechanical simplicity.

An example of a complex map display system is the television type system where a map of the entire area over which the craft can range is recorded, greatly reduced in size, on a glass slide. A small area of the glass slide, representing an area of 100 square miles, for example, is scanned by a television camera and the scanned area is displayed on the screen of a cathode ray tube in the cockpit. The scanned area is moved as the position of the craft changes so that the area displayed is always that over which the craft is flying. By rotating the deflection yoke of the cathode ray tube, the map can be oriented with the aircraft always heading toward the top of the display. As only the cathode ray tube and its deflection circuits need be located in the cockpit, the other units of the system may be situated where desired in other parts of the craft. In addition to displaying map information, the cathode ray tube can be used to display other information, on a time sharing basis, or other data can be superimposed on the map display. The complexity of the television display system is in marked contrast to the simplicity of the strip type map display and the weight of the television display system far exceeds the weights obtainable with the simpler systems.

It is an object of the invention to provide an airborne map display system that is relatively simple, accommodate large deviations from a preplanned course, and even permits operation without requiring a preselected route.

The invention employs a map comprising strips of uniform length and width which are arranged in sequence to form one long continuous band. In the invention, one map strip is displayed until the position of the craft, represented by a marker, runs off the edge of the displayed map. Upon running off, the map strip showing the contiguous area is automatically brought into position so that the marker shows the craft's position on the new strip. The invention has provisions for manual operation which are actuable when the marker approaches the edge of a strip to permit the strip showing the contiguous area to be brought into position, without requiring the marker to run off the edge of the previously displayed map.

The invention, both as to its construction and mode of operation, can be better understood from the following exposition when considered together with the accompanying drawings in which.

Figure 1:
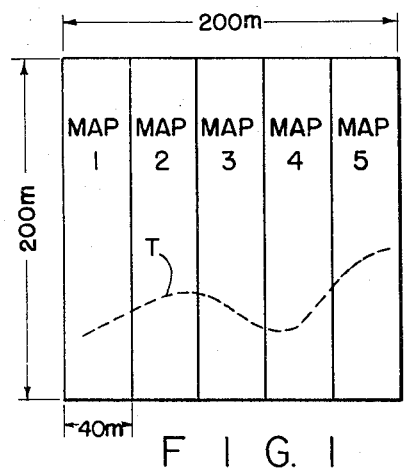
FIG. 1 illustrates the devision of a chart into map strips of identical length and width.
Figure 3:
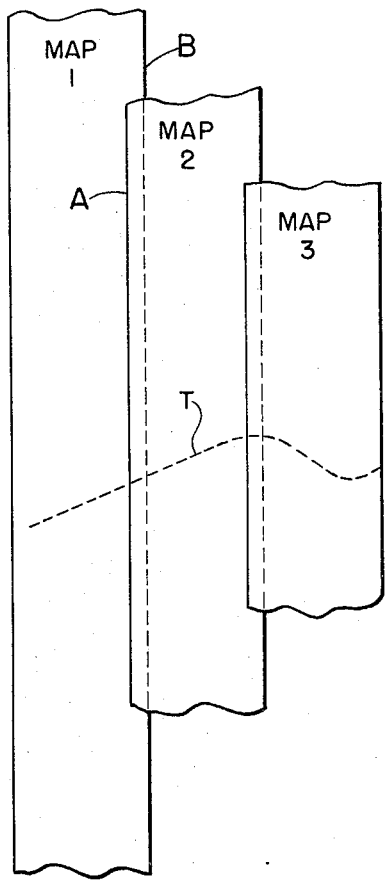
FIG. 3 depicts the overlap of contiguous map strips.
Figure 2:
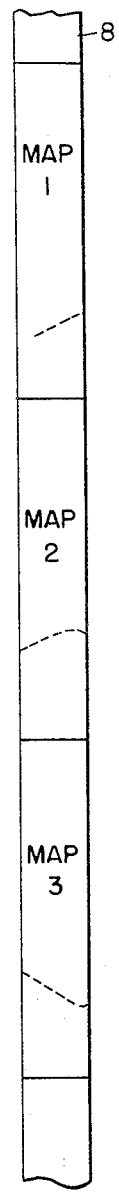
FIG. 2 depicts the map strips joined to form a sequence of strips in accordance with the invention.

FIG. 1 represents a standard aeronautical chart, assumed by way of example to be a map of an area 200 miles square. The track of an aircraft is indicated by the broken line T on the chart. The map is divided into five strips, each strip representing an area 40 miles wide and 200 miles long. The strips are cut apart and cemented together in sequence to form a long band or strip map as shown in FIG. 2. The first and last strips in the sequence are attached to "leaders," such as the leader 8. A leader is simply an additional strip which serves as means for attaching the strip map to rollers. Because of the sequence of the strips, strip 2 shows the area contiguous to strip 1, strip 3 shows the area contiguous to strip 2 and so on. As it is desired to have some overlap between the area shown on one strip and the area shown on the next strip, the strips are cut from two identical charts in a manner such that when the strips are placed side by side, as shown in FIG. 3, to form a complete chart, each strip overlaps the adjacent strip. Thus, each strip in FIG. 2 actually shows the 40 mile wide area, as in FIG. 1, and a 5 or 10 mile wide area contiguous to it.

Where an aircraft's track, as indicated by the broken line T in FIG. 3, crosses from one map strip onto the adjacent map strip, the invention is arranged, by means described herein, to permit the adjacent strip to be substituted upon command of a manual signal when the track reaches the edge A of the adjacent strip. If no manual signal is given, the apparatus is arranged to cause the adjacent strip, map strip 2, to replace map strip 1 when the track reaches the edge B of map strip 1.

While not forming part of the invention, it is assumed the aircraft carries apparatus providing signals of the craft's velocity in orthogonal directions. Such apparatus is known and customarily provides a signal representing the aircraft's ground speed in the North-South (N-S) direction and a signal representing the aircraft's ground speed in the East-West (E-W) direction. One signal, for example the N-S signal, is employed to control the movement of the strip map while the other signal is employed to control the movement of a marker.

Figure 4:
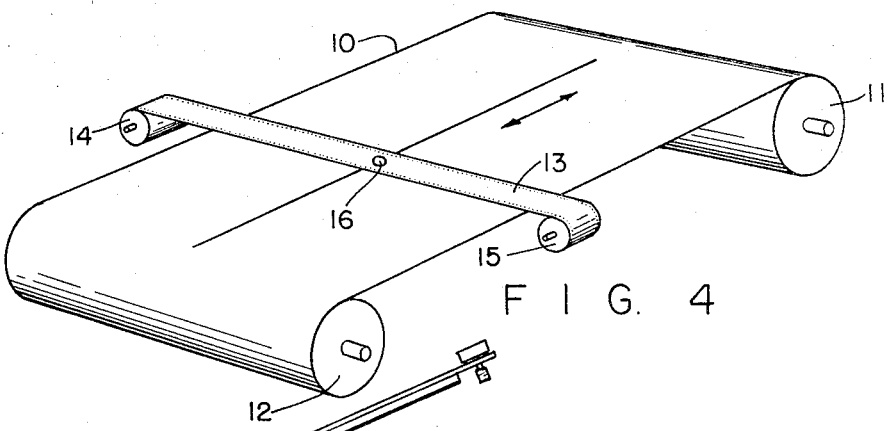
FIG. 4 shows the relation of the cross tape to the strip map.

In FIG. 4, the strip map 10 of FIG. 2 is shown mounted upon rollers 11 and 12. A cross tape 13, of a flexible and transparent material, extends transversely over the map and is secured upon rollers 14 and 15. A marker 16 is provided on the tape which indicates the aircraft's position on the chart.

Figure 5:
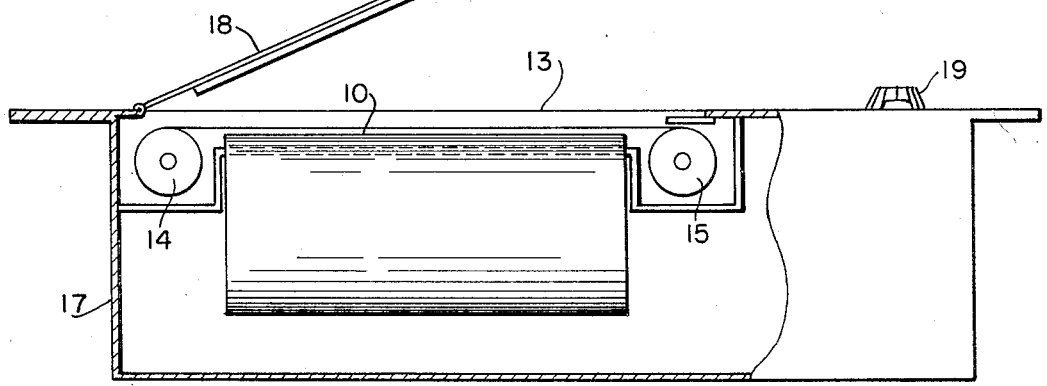
FIGS. 5 and 6 are views of the housing in which the strip map is disposed.
Figure 6:
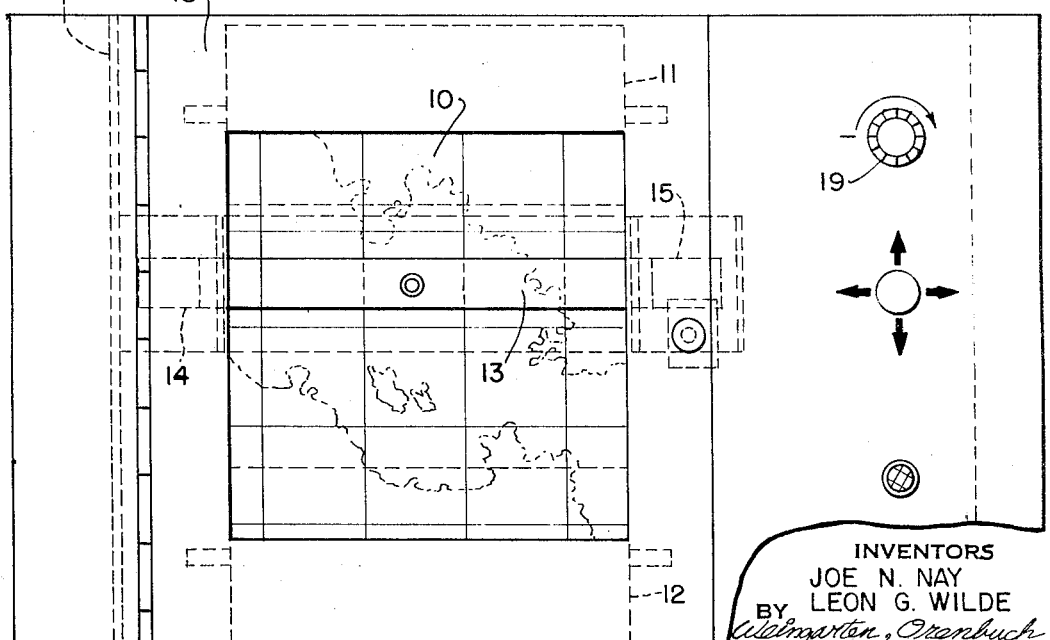

The strip map and cross tape are mounted, by means of their rollers, in a housing 17, shown in FIG. 5, having a hinged lid 18. The map 10 passes underneath the cross tape 13 and the map is visible, as shown in FIG. 6, through a window in the hinged lid. The housing, preferably, has illuminating means, such as edge lighting about the perimeter of the window, whose intensity is controlled by a dimmer knob 19.

Figures 7, 8:
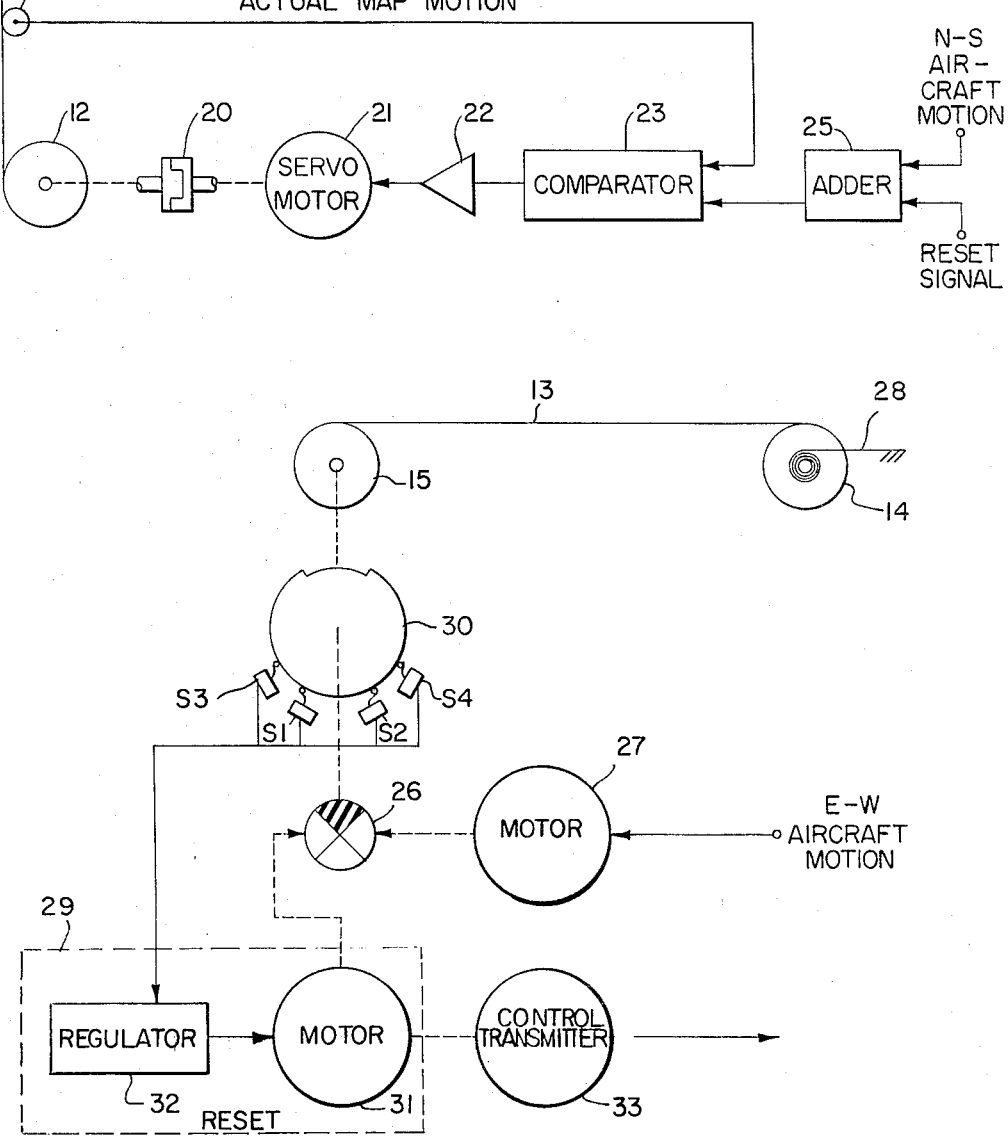
FIG. 7 shows the scheme of the apparatus controlling the motion of the strip map.
FIG. 8 shows the scheme of the apparatus controlling the motion of the cross tape.

FIG. 7 diagrammatically shows the arrangement for driving the strip map. The roller 12 is connected by a clutch 20 to a servo motor 21 controlled by a servo amplifier 22 in response to an error signal from a comparator 23. The N-S signal of aircraft motion is applied to the comparator together with a signal obtained from the motion of the strip map. When the adjacent map strip is to be displayed, a reset signal, generated by apparatus later described herein, is algebraically added to the N-S signal of aircraft motion in a signal combining circuit 25 and the combined signal is applied to the comparator.

As the map 10 is wound on rollers 11, 12, there is a variation in diameter when the strip is rolled on or off. Rotation of the roller, therefore, is an inexact measure of the amount of strip map rolled on or off.

To accurately measure the motion of the strip map, the map is caused to drive a converter 24 which changes the angle through which a shaft turns to an electrical signal. Devices for converting shaft angle movement to electrical signals are well known and where the electrical signal is encoded such devices are termed "shaft angle encoders." In order to drive the converter, the chart is caused to ride over a wheel provided with a tire of rubber or other material to assure good frictional contact. The wheel in turn is attached to the input of the converter. Movement of the wheel results in an electrical signal that is compared in comparator 23 with the signal from adder 25. The comparator, by emitting an error signal, causes servo motor 21 to drive the roller 12 at a rate such that the movement of the map corresponds to the ground speed of the aircraft in the North-South direction. Roller 11, preferably, is provided with a helical spring 9 which maintains tension on the strip map and causes the map to be wound on roller 11 whenever the servo motor drives roller 12 in the direction causing the map to be unwound from roller 12.

The arrangement for driving the cross tape is schematically shown in FIG. 8. The tape 13 is wound on rollers 14 and 15, with roller 15 being driven through a differential mechanism 26 by a motor 27 which responds to the E-W signal of aircraft motion.

Tension on cross tape 13 is maintained by a spring 28 attached to the shaft to which roller 14 is keyed. The spring, by virtue of its construction, maintains a constant tension on the tape regardless of the number of revolutions made by roller 15. As the amount of travel required to be made by the cross tape is very limited and because the tape is of thin material, the change in reel diameter as the tape rolls on or off the rollers is negligible. Angular movement of the rollers, therefore, is a sufficiently accurate measure of the linear motion of the cross tape. A cam 30 is driven by the shaft keyed to roller 15. Four switches S1, S2, S3, S4 are equipped with cam followers that ride upon the surface of cam 30. The switches remain open so long as their cam followers do not ride down into the notch of the cam. When the marker of cross tape 13 nears the right edge of the map, right enable switch S4 closes. Further motion of the cross tape marker toward the map's right edge causes closure of right limit switch S2. Similarly, closing of left enable switch S3 and left limit switch S1 ensues when the cross tape's marker approaches the left edge of the map. Closure of the right or left enable switch permits the appropriate adjacent map strip to be displayed by operation of a manual reset switch S5. Closing of the right or left limit switch automatically causes the appropriate adjacent map strip to replace the map strip then displayed. The switches control a resetting mechanism 29 that furnishes another input to differential 26. Upon being actuated, the resetting mechanism causes the cross tape marker to be driven to the opposite side of the display so that the marker is appropriately positioned upon the new map strip that replaced the formerly displayed strip. The resetting mechanism employs a motor 31 which, under the government of a regulator 32, makes a number of revolutions, that in the absence of E-W aircraft motion, causes the cross tape's marker to be driven a precise distance in the opposite direction. Motor 31 also actuates a control transmitter 33 which causes the adjacent map strip to be brought into position where it is correctly displayed. Mechanism 33 is a signal generator whose output causes the strip map to be moved a predetermined distance in the absence of N-S aircraft motion.

Figure 9:
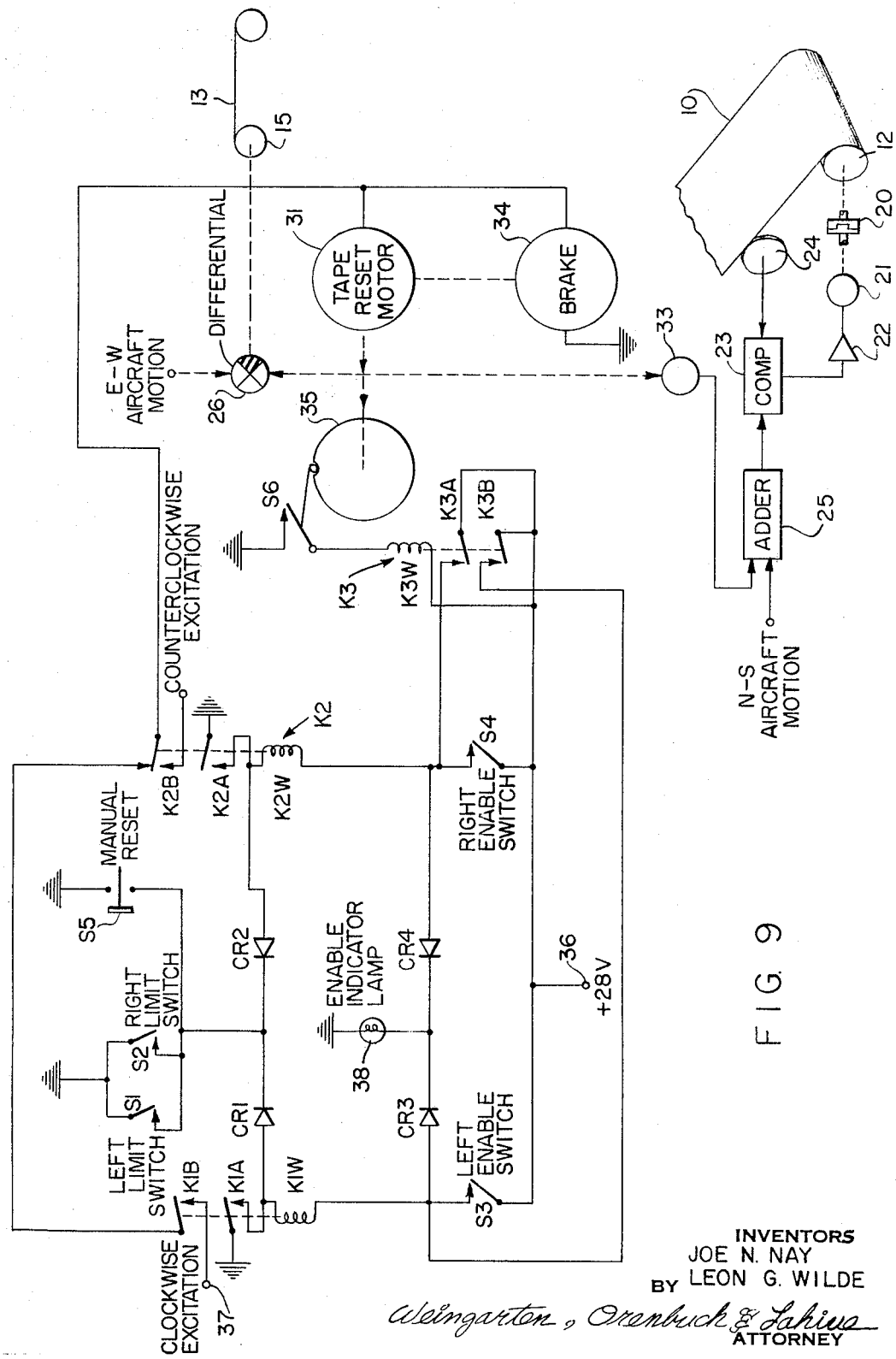
FIG. 9 schematically depicts an embodiment of the invention.

Operation of the invention can be better understood by considering the arrangement depicted in FIG. 9. Assuming a condition where the marker of the cross tape is between the enable points of the map, reset motor 31 is held from turning by brake 34. The E-W aircraft motion, therefore, is the sole effective input to differential 26 and the output of the differential drives the tape's marker across the map at a rate according with the E-W movement of the aircraft. Enable switches S3 and S4, limit switches S1 and S2, and manual reset switch S5 are open. Reset motor 31 is connected by a drive shaft arrangement to a cam 35 that controls a switch S6. With switch S6 open, current is prevented from flowing from terminal 36 through the winding K3W of a relay K3.

Assuming the E-W movement of the craft causes the cross tape marker to move toward the left edge of the map, when the marker approaches the left map margin, left enable switch S3 closes causing one end of winding K1W of relay K1 to be connected to the electric potential at terminal 36 and causing enable indicator lamp 38 to be lit by the current flow through diode CR3. If a view of the adjacent map strip is desired, manual reset button S5 is closed to permit current to flow through winding K1W and diode CR1. Where the manual reset switch is not closed and the cross tape marker moves to the extreme left edge of the map, left limit switch S1 closes and permits a current to flow from terminal 36, through relay winding K1W and diode CR1 to ground. Energization of relay winding K1W causes contacts K1A and K1B to close. Energization of winding K2W of relay K2 is blocked by diode CR4.

Closing of relay contacts K1B causes reset motor 31 to be energized and simultaneously causes brake 34 to release. The excitation signal at terminal 37 is such as to cause reset motor 31 to drive the cross tape marker toward the right edge of the map. The initial motion of the reset motor, in driving the cross tape toward the right through the differential 26, causes left limit switch S1 to open by rotation of cam 30 (FIG. 8). Relay winding K1W remains energized, though switch S1 opens, because of the current path provided by closed relay contacts K1A. After switch S1 has opened, cam 35, which is driven by the reset motor, causes switch S6 to close. Relay winding K3W is energized by the current which flows from terminal 36 upon closure of switch S6 and the energized winding causes relay contacts K3A and K3B to close. Reset motor 31 remains energized and further movement toward the right of the cross tape results in the opening of left enable switch S3. Relay winding K1W, however, is maintained energized by the current shunted around switch S3 by closed contacts K3B.

Energization of relay winding K2W is now blocked by diode CR1. Reset motor 31 remains energized until cam 35 has made one full turn. Upon the completion of a revolution by cam 35, the cam follower of switch S6 rides down into the notch in the cam and causes switch S6 to open. The circuit through winding K3W is interrupted by the opening of switch S6 causing relay K3 to be reenergized so that contacts K3A and K3B open. The circuit through winding K1W of relay K1 is interrupted by the breaking of contacts K3B, causing relay K1 to become deenergized so that contacts K1A and K1B open. Opening of contacts K1B causes the reset motor to be deenergized and simultaneously permits brake 34 to quickly bring the reset motor to a stop. At this time the marker of the cross tape is at the right of the map, having been driven across the map's left margin.

Even while the cross tape was being reset to the right, the tape drive governed by the E-W motion of the map continued in operation so that the marker of the cross tape recorded the correct position of the craft on the map.

During the time the cross tape's marker is reset toward the right, the adjacent map strip is substituted in the display. The precise length of each map strip being known, a map reset signal is generated causing the map to be advanced in the appropriate direction by the known distance. The map reset signal is generated by control transmitter 33. The control transmitter is driven by reset motor 31 and puts out signals causing servomotor 21 to be driven the required number of revolutions to bring the adjacent map strip into place. To take into account the N-S movement of the craft during the time the map is being reset, the reset signals and the signals representing N-S aircraft movement are algebraically added to provide a composite signal to comparator 23. As previously explained in connection with FIG. 7, the comparator compares the actual map motion with the composite signal and emits an error signal causing the servomotor to drive roller 12 until the map is correctly placed.

In explaining the resetting operation, it was assumed that the cross tape marker approached the map's left edge. Where the cross tape marker moves to the map's right margin, right enable switch S1 and right limit switch S2 close. The sequence that now ensues causes reset motor 31 to be driven in the counterclockwise direction so that the cross tape is driven from right to left. As a corollary the signal now generated by control transmitter 33 causes the servomotor to be driven in the direction causing the map strip adjacent to the right edge to be substituted in the display. That is, servomotor 21 causes roller 12 to rotate in one direction when left limit switch has been actuated and causes roller 12 to rotate in the other direction when the right limit switch has been actuated.

Figure 10:
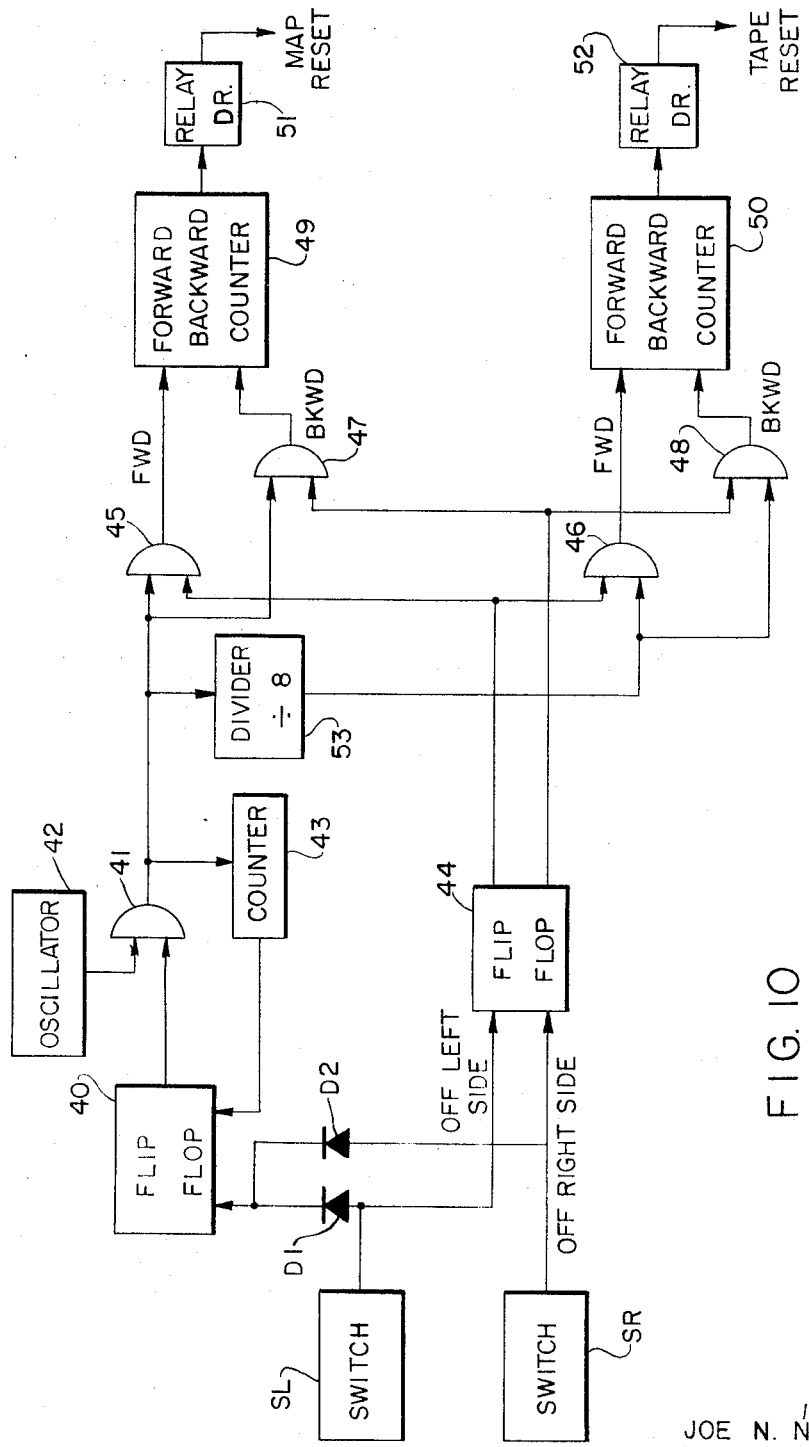
FIG. 10 depicts another embodiment of the invention.

Shown in FIG. 10 is the scheme of an alternate arrangement for resetting the map and tape when the indicator reaches the right or left edge of the displayed map strip. A limit switch SL is arranged to close when the tape marker arrives at the left edge of the map strip and another limit switch SR is arranged to close when the right edge is reached. Limit switches SL and SR are preferably arranged in the same manner as switches S1 and S2 of FIG. 8. When the limit switch closes, it generates a "start" signal. The output of limit switch SL is coupled through a diode D1 to one input of a control flip-flop 40 and the output of limit switch SR is coupled to that same input of the control flip-flop by a diode D2. Upon receiving a start signal from one of the limit switches, the control flip-flop changes states and thereby provides an enabling signal to gate 41. Upon being enabled, gate 41 permits clock signals from oscillator 42 to pass through the gate into counter 43. After receiving a predetermined number of clock pulses, the counter emits a signal to flip-flop 40 which resets that device to its initial state. The control flip-flop, upon being reset, disables gate 41 so that no further clock pulses pass the gate.

A polarity flip-flop 44 has one input coupled to right limit switch SR and its other input coupled to left limit switch SL. Upon receiving a start signal from limit switch SL, the polarity flip-flop assumes a stable state such that its outputs enable gates 45 and 46 while disabling gates 47 and 48. In response to a start signal from limit switch SR, the flip-flop assumes its second stable state and thereby disables gates 45 and 46 while enabling gates 47 and 48. Gates 45 and 47 control the direction of counting of a forward-backward counter 49 and gates 46 and 48 control the direction of counting of a forward-backward counter 50. The output of reversible counter 49 is employed to control a relay drive mechanism 51 that causes a motor to be stepped about in 120° steps for each pulse received by the counter so that the contiguous map strip is displayed. The relay mechanism causes the motor to be driven in one direction when the counter counts "forward" and in the opposite direction when the count is "backward."

The output of reversible counter 50 is similarly employed to control a relay drive mechanism 52 that causes another motor to be stepped in the same fashion so that the tape indicator is reset while the contiguous map strip is brought into position. A dividing mechanism 53 precedes the input to forward-backward counter 50. Assuming that the aeronautical chart used in the map display is cut into eight strips, then the movement necessary to reset the tape is one-eighth the movement required to reset the map strips. Therefore, the number of clock pulses emerging from gate 41 are divided by eight before being permitted to pass into counter 50.

Modifications of the embodiments of the invention depicted in the drawings may be made without departing from the essential concept of the invention and, indeed, are apparent to those skilled in the electronics art. It is intended, therefore, that the invention not be limited to the precise arrangements illustrated, but rather that the invention's scope be construed as delimited by the appended claims.

What is claimed is:

1. A map display apparatus for providing a continuous indication of the instantaneous position of a moving vehicle comprising a plurality of contiguous map segments arranged in sequence end to end to form a continuous strip map sequentially displaying adjacent areas of an overall map, each map segment including a predetermined portion of the contiguous map segment; indicating means overlying said strip map to provide an indication of the position of the moving vehicle on the strip map; means for moving said strip map in accordance with the motion of said moving vehicle in a first direction; means for moving said indicating means in accordance with the motion of said moving vehicle in a direction orthogonal to said first direction; switching means adapted to be actuated as indicating means approaches a lateral edge of said continuous strip map; electronic digital processing means responsive to the actuation of said switching means to cause the contiguous map segment to be substituted for the existing map segment and to cause said indicating means to move with respect to the substituted map segment to a location corresponding to the instantaneous geographical position of said moving vehicle; said electronic digital processing means including generating means to produce a continuous train of clock pulses; gating means having first and second input terminals and first and second output terminals; coupling means responsive to the actuation of said switching means to couple said clock pulse train to said first and second input terminals of said gating means; a first counter having an input line connected to said first output terminal of said gating means and an output line connected to said means for moving the strip map; a second counter having an input line connected to said second output terminal of said gating means and an output line connected to said means for moving the indicating means; said gating means responsive to the actuation of said switching means to pass said clock pulse train to said first and second counters; said first and second counters being responsive to said clock pulse train to provide an output pulse train to said map moving means and said indicating moving means, respectively; and, sensing means coupled to the output of said generating means for providing an output signal to said coupling means to disable the latter means after the occurrence of a predetermined number of clock pulses.

2. A map display apparatus for providing a continuous indication of the instantaneous position of a moving vehicle comprising a plurality of contiguous map segments arranged in sequence end to end to form a continuous strip map sequentially displaying adjacent areas of an overall map, each map segment including a predetermined portion of the contiguous map segment; indicating means overlying said strip map to provide an indication of the position of the moving vehicles on the strip map; means for moving said strip map in accordance with the motion of said moving vehicle in a first direction; means for moving said indicating means in accordance with the motion of said moving vehicle in a direction orthogonal to said first direction; switching means adapted to be actuated as said indicating means approaches a lateral edge of said continuous strip map; electronic digital processing means responsive to the actuation of said switching means to cause the contiguous map segment to be substituted for the existing map segment and to cause said indicating means to move with respect to the substituted map segment to a location corresponding to the instantaneous geographical position of said moving vehicle; said electronic digital processing means including generating means to produce a continuous train of clock pulses; gating means having first and second input terminals and first and second output lines; coupling means connected to said generating means and resposive to the actuation of said switching means to couple said clock pulse train to said first and second input terminals of said gating means; said gating means responsive to the actuation of said switching means to pass said clock pulse train to said first and second output lines; first means connected to said first output line to apply a pulse output signal to said strip map moving means; second means connected to said second output line to apply a pulse output signal to said indicating moving means; and, sensing means responsive to said clock pulse train to disable said coupling means after the occurrence of a predetermined number of clock pulses.

References Cited by the Examiner

UNITED STATES PATENTS

| 2,836,816 | 5/1958 | Allison et al. | 346—112 |
| 2,857,234 | 10/1958 | Murray | 346—8 |
| 3,160,851 | 12/1964 | Ramsayer et al. | 340—24 |

RICHARD B. WILKINSON, *Primary Examiner.*

J. W. HARTARY, *Assistant Examiner.*